United States Patent [19]
Jiang

[11] Patent Number: 5,753,117
[45] Date of Patent: May 19, 1998

[54] REPLACEABLE FILTER ELEMENT AND SNAP-ON FILTER LID ASSEMBLY

[75] Inventor: Zemin Jiang, Cookeville, Tenn.

[73] Assignee: Fleetguard, Inc., Nashville, Tenn.

[21] Appl. No.: 658,738

[22] Filed: Jun. 5, 1996

[51] Int. Cl.$^6$ .................................................. B01D 27/08
[52] U.S. Cl. ...................... 210/232; 210/450; 210/453; 210/455; 210/493.2; 210/497.01; 55/497; 55/500; 55/502
[58] Field of Search ............................ 210/232, 450, 210/453, 455, 454, 493.2, 497.01; 55/497, 500, 502

[56] References Cited

U.S. PATENT DOCUMENTS

| | | |
|---|---|---|
| 1,916,859 | 7/1933 | Heller . |
| 2,568,181 | 9/1951 | Zimmerman et al. . |
| 2,585,887 | 2/1952 | Woodward . |
| 2,627,359 | 2/1953 | Woodward . |
| 3,460,682 | 8/1969 | Onufer . |
| 4,321,139 | 3/1982 | Auclair . |
| 4,349,363 | 9/1982 | Patel et al. . |
| 4,625,890 | 12/1986 | Galer . |
| 4,946,598 | 8/1990 | Murphy et al. . |
| 5,186,829 | 2/1993 | Janik . |
| 5,259,953 | 11/1993 | Baracchi et al. . |
| 5,453,189 | 9/1995 | Joergensen . |

*Primary Examiner*—W. L. Walker
*Attorney, Agent, or Firm*—Woodard Emhardt Naughton Moriarty & NcNett

[57] ABSTRACT

A replaceable filter cartridge for use in a fluid filter assembly includes a substantially cylindrical filter element including a pair of oppositely disposed filter element ends. A first endplate is bonded to one of the filter element ends so as to close the end and prevent fluid leakage therethrough. A second endplate is bonded to the opposite filter element end so as to close the opposite end and prevent fluid leakage therethrough. The second endplate includes an outer annular wall which is sized so as to create a noticeable distance of separation between the second endplate outer wall and the outer surface of the filter element and thereby define an annular clearance space therebetween. The outer wall of the second endplate is annular and substantially concentric with the filter element and provides a lip or free edge for the snap-on assembly of a closing lid member. By configuring the lid member with a series of snap-over fingers, it is possible to simply snap the lid onto the second endplate and thereafter use the lid for handling and manipulation of the replaceable filter cartridge.

16 Claims, 5 Drawing Sheets

REPLACEABLE FILTER ELEMENT AND SNAP-ON FILTER LID ASSEMBLY

BACKGROUND OF THE INVENTION

The present invention relates in general to fluid filter assemblies which include a replaceable filter element or cartridge. Such assemblies have a defined fluid flow path into and out of the cooperating outer housing. The open end of the housing is typically closed in some fashion and the filter cartridge is positioned inside the outer housing in the desired manner in order to facilitate the defined fluid flow path. More specifically, the present invention relates to a snap-fit design for securing the replaceable filter cartridge in position as part of a lid subassembly. A cooperating lid is used to receive and retain the replaceable filter cartridge. In turn, the filter cartridge has a unique design to enable this snap-on assembly into the filter lid. The filter lid is threaded into the open end of the outer housing and closes the open end so as to prevent any undesired fluid leakage. The lid also helps to further define the desired fluid flow path.

The design of fluid filters typically encompasses a number of manufacturing considerations as well as practical considerations for use, such as how to install and remove a replaceable filter cartridge. When a replaceable filter cartridge is installed in an outer housing, the primary objective is to establish a flow path into the housing, a path through the filter element portion of the cartridge, and an exit location. The flow through the filter element should be distributed so as to utilize the entirety of the filtering media in the filter cartridge. Appropriate seals are provided in order to prevent leakage and to preclude the bypass of unfiltered fluid.

One consideration in the design of fluid filters is the handling and disposal of the dirty and clogged filter cartridge. While the entire fluid filter assembly could be discarded, the outer housing often represents a more expensive package which has a substantially longer life than the filter cartridge. Accordingly, it is common for just the dirty filter element or the filter cartridge to be removed and replaced by a new cartridge, continuing to reuse the outer housing. As a result of this practice, the ease of removal, handling of the dirty filter cartridge, and installation of a new filter cartridge have become the focus of various design efforts.

In United States patent application Ser. No. 08/250,593, which was filed on May 27, 1994 and is now U.S. Pat. No. 5,549,821, by Bounnakhom, et al., different design approaches are described for securing a replaceable filter element in position. One approach involves a snap-fit assembly of an endplate/centertube member into an integrally molded extension in the closed end of the outer housing. Another approach involves threaded engagement between the endplate/centertube member and the molded extension.

If the design objective is directed to the handling of the dirty filter element, less attention may be paid to the manner of anchoring the filter element to some portion or extension of the outer housing. Rather, what needs to be considered is how and where to grasp the dirty filter element and how to extract it from the outer housing. One of the design questions to be addressed is whether it is possible for the user to avoid contact with the fluid which has been filtered and avoid contact with those portions of the filter element which are ladened with dirty fluid. Other questions must be asked, such as whether the filter element will leak or drip fluid. Are the materials being used ecologically friendly as materials which can be recycled or incinerated?

In the present invention, a particular style of lid is designed for threaded engagement into the open end of the outer housing in order to seal that open end closed and help to establish the desired fluid flow path through the filter assembly. The lid includes snap-on fingers which grasp an enlarged endplate on the replaceable filter cartridge so as to enable handling and manipulation of the filter cartridge without direct contact. The lid is used for such handling and it also helps to secure and anchor the replaceable filter cartridge in its desired position in the outer housing. After the dirty filter cartridge is removed, by unscrewing the lid from the housing and pulling outwardly, the filter cartridge is separated from the reusable lid by flexing the lid into a convex shape so as to fan out some of the gripping fingers. This increases the effective diameter on enough of the fingers for the lid to disengage and the dirty filter cartridge thereafter is able to pop free without having to be handled directly by the user.

An important feature of the present invention is the enlarged endplate which is bonded to one end of the replaceable filter element. By providing an endplate with a larger outside diameter and a corresponding lip or free edge, there is a surface provided for the gripping fingers of the lid to extend over and around. A conventionally-sized endplate which is closely sized to the outside diameter of the filter element does not provide enough clearance around the edge surface for secure attachment (snap-fit receipt) of the lid.

Over the years, a variety of filters and filter elements have been designed for various fluids. The following listed United States patents are believed to provide a representative sampling of these earlier design efforts:

| PATENT NO. | PATENTEE | ISSUE DATE |
| --- | --- | --- |
| 1,916,859 | Heller | Jul. 4, 1933 |
| 2,568,181 | Zimmerman et al. | Sep. 18, 1951 |
| 2,585,887 | Woodward | Feb. 12, 1952 |
| 2,627,359 | Woodward | Feb. 3, 1953 |
| 4,321,139 | Auclair | Mar. 23, 1982 |
| 4,625,890 | Galer | Dec. 2, 1986 |
| 5,186,829 | Janik | Feb. 16, 1993 |
| 5,259,953 | Baracchi et al. | Nov. 9, 1993 |
| 3,460,682 | Onufer | Aug. 12, 1969 |
| 5,453,189 | Joergensen | Sep. 26, 1995 |
| 4,349,363 | Patel et al. | Sep. 14, 1982 |
| 4,946,598 | Murphy et al. | Aug. 7, 1990 |

Even though a variety of designs are covered by the listed patents, the specific features of the present invention, including the lid design as well as the uniquely styled filter element, are novel and unobvious.

SUMMARY OF THE INVENTION

A replaceable filter cartridge for use in a fluid filter assembly according to one embodiment of the present invention comprises a filter element having a substantially cylindrical outer surface and including a pair of oppositely disposed filter element ends, a first endplate bonded to one of the filter element ends wherein the first endplate has an outer, substantially annular wall at a first distance of separation radially beyond the outer surface, a second endplate bonded to the other, oppositely-disposed filter element end, the second endplate having an outer, substantially annular wall which is positioned at a second distance of separation radially beyond the outer surface wherein the second distance of separation is greater than the first distance of separation.

One of the objects of the present invention is to provide an improved replaceable filter cartridge for a fluid filter assembly.

Related objects and advantages of the present invention will be apparent from the following description.

DESCRIPTION OF THE PREFERRED EMBODIMENT

Figure 1:
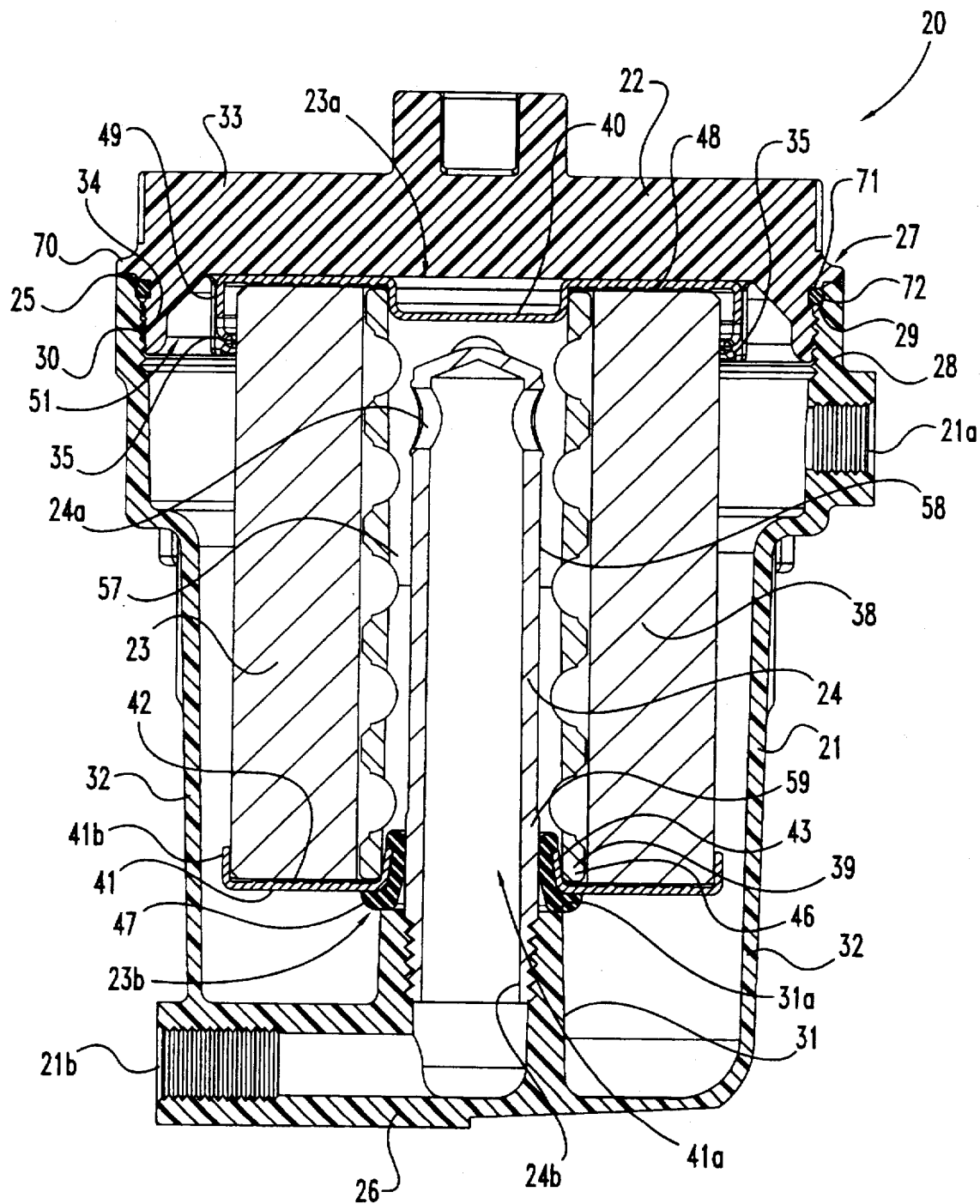
FIG. 1 is a side elevational view in full section of a fluid filter assembly according to a typical embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
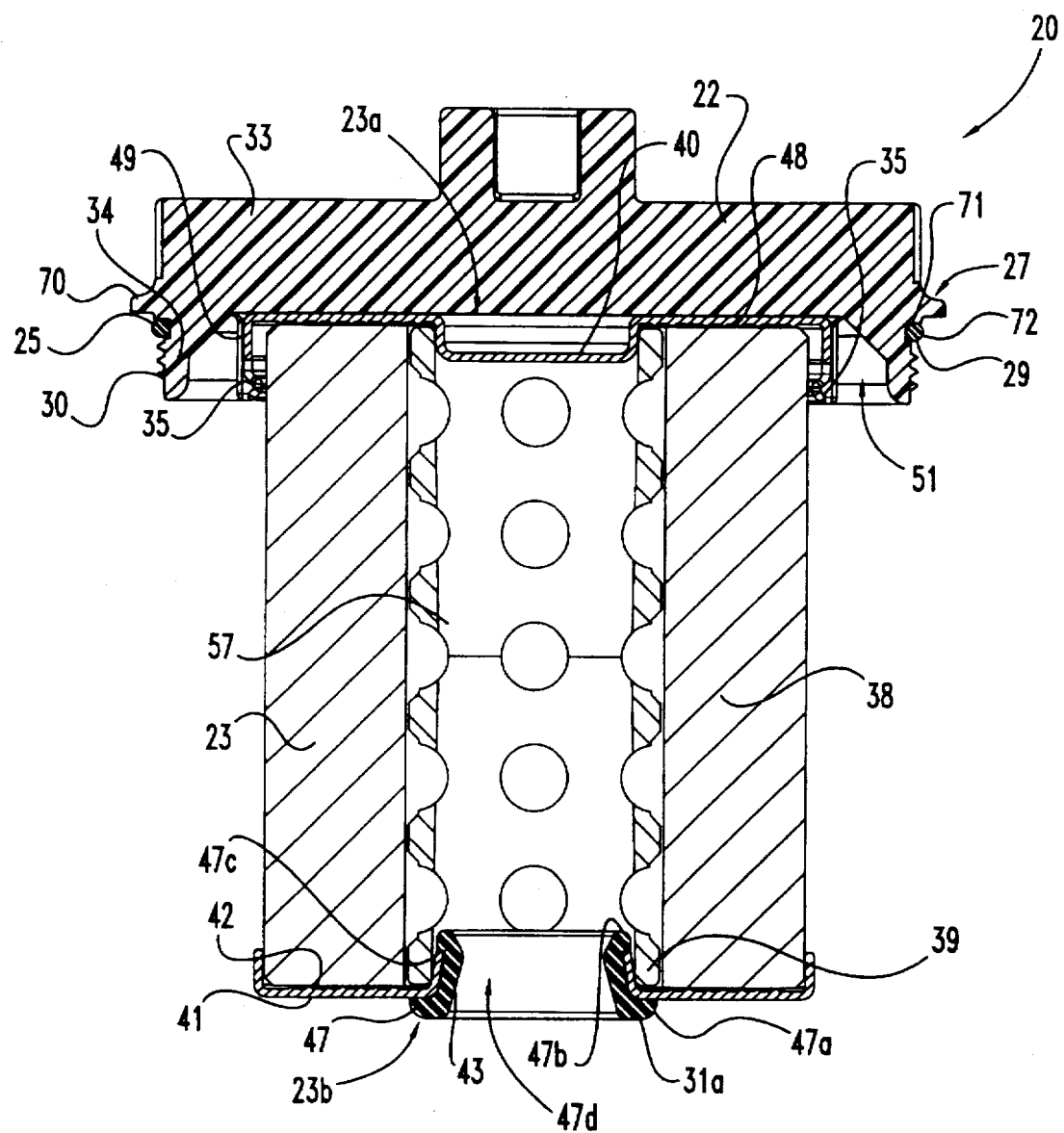
FIG. 2 is a side elevational view in full section of a lid and filter cartridge subassembly of the FIG. 1 fluid filter assembly according to the present invention.

Referring to FIGS. 1 and 2, there is illustrated a fluid filter assembly 20 which includes an outer housing 21, closing lid 22, replaceable filter cartridge 23, centerpost 24, and O-ring 25. While the actual outer housing 21, closing lid 22, and filter cartridge 23 may typically include a number of structural features and cooperating components, for the most part these have been omitted for two reasons. First, the present invention does not relate directly to these structural features and components. So long as the key features are included, the present invention is suitable for use with virtually any outer housing, closing lid, and filter cartridge. Secondly, several of the structural features and components have been omitted for drawing clarity. It is easier to see and visualize the features of the present invention if these other structural features and components, associated with the outer housing 21, closing lid 22, and filter cartridge 23, are omitted.

As will be understood and as described in greater detail hereinafter, the outer housing is internally threaded at its open end and the closing lid is externally threaded so as to threadedly engage with the outer housing in order to close the open end of the outer housing. As this threaded engagement occurs, O-ring 25 is compressed between the closing lid 22 and outer housing 21 so as to establish a liquid-tight interface at that location. With regard to the specifics of the present invention, one of the key features is an enlarged outside diameter on one of the endplates which is bonded to the filter element. A cooperating feature is the plurality of snap-on fingers provided as part of the closing lid. As will be described, the fingers of the lid are effective to snap over and around the outer wall and lower edge of the enlarged endplate so as to enable installation and removal of the replaceable filter cartridge by handling the lid and without having to handle the filter cartridge.

The molded outer housing 21 is a unitary member which is closed at its base or bottom end 26 and is open at its opposite, upper end 27. An inlet fitting 21a is formed as part of housing 21 adjacent to upper end 27. Fitting 21a is internally threaded for receipt of a cooperating fluid connection. An outlet fitting 21b is formed as part of housing 21 adjacent bottom end 26. Fitting 21b is internally threaded for receipt of a cooperating fluid connection. The flow path through fluid filter assembly 20 begins at inlet fitting 21a, passes through filter cartridge 23 from the outside inwardly, and flows into hollow centerpost 24 by way of openings 24a. The hollow interior of the centerpost is in flow communication with outlet fitting 21b. Upper end 27 includes an outer annular wall 28 formed with a horizontal shelf 29 and a series of internal threads 30 positioned directly below shelf 29.

The base or bottom end 26 is molded with a raised, substantially cylindrical stem 31 which is internally threaded and extends up into the hollow interior of the outer housing 21. Stem 31 is substantially concentric with the annular wall 32 of the outer housing and substantially concentric with lid 22 and cartridge 23. Centerpost 24 is a substantially cylindrical, substantially straight tubular member which is externally threaded at end 24b and closed at the opposite end adjacent openings 24a. As will be described hereinafter, centertube 24 has an upper portion with a first outside diameter size and a lower portion closer to the external threads with a slightly larger diameter portion. The difference in outside diameter size between these two portions is provided in order to facilitate the slide-on assembly of the filter cartridge 23.

As the filtered fluid passes through the filter cartridge from the outside inwardly, the only exit path is to flow into openings 24a. From there, the filtered fluid flows through the centerpost 24 and exits by way of outlet fitting 21b. In order to help establish the described flow path, the upper end 23a of cartridge 23 is closed and the lower end 23b is configured so as to seal radially against and around the outside diameter of centerpost 24 and to seal axially against the upper end 31a of stem 31.

The molded closing lid 22 is an annular, unitary member which includes an upper body portion 33, an externally threaded outer annular wall 34 depending from upper body portion 33 and an inner series of snap-over fingers 35 depending from the underside of upper body portion 33. A total of eight fingers 35 are integrally molded as part of lid 22 and are equally spaced in a circumferential array in the shape of an annular wall which is substantially concentric to outer annular wall 34. The eight fingers 35 all extend in an axial direction.

The replaceable filter cartridge 23 is a hollow, substantially cylindrical assembly which includes a substantially cylindrical filter element 38, a substantially cylindrical inner liner 39, and a pair of annular endplates 40 and 41. A layer of adhesive such as a polyurethane potting compound or plastisol is used to securely bond each endplate 40 and 41 to the subassembly of the filter element 38 and the inner liner 39.

Figure 3:
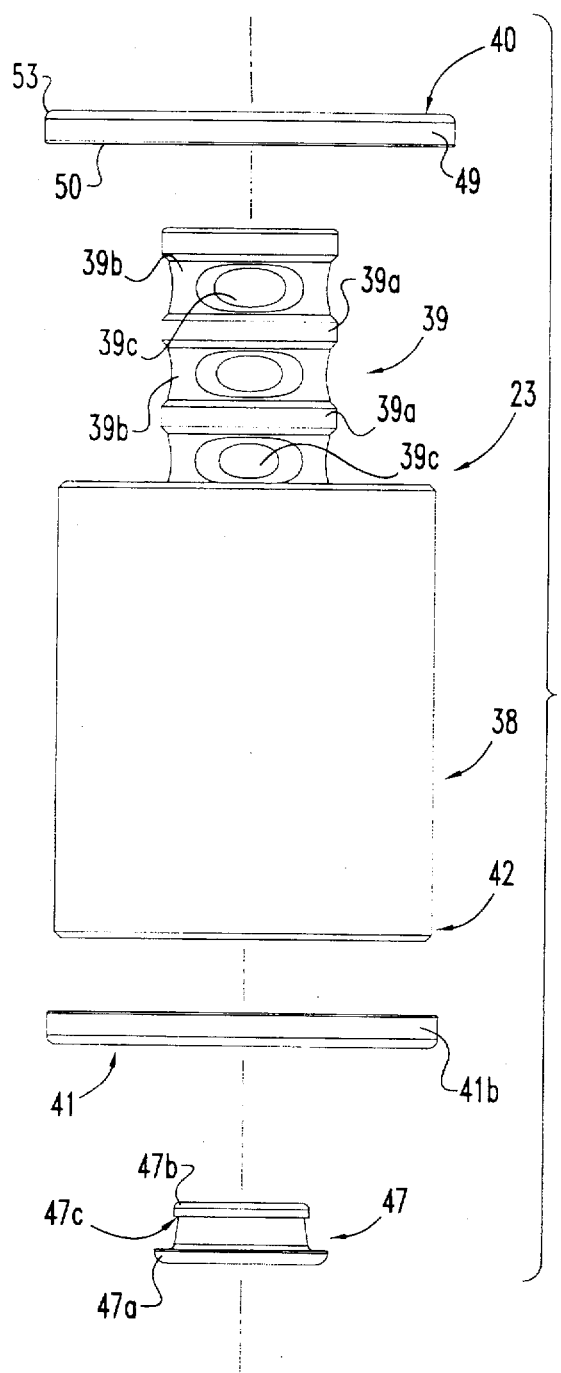
FIG. 3 is an exploded side elevational view of the FIG. 2 filter cartridge.
Figure 4:
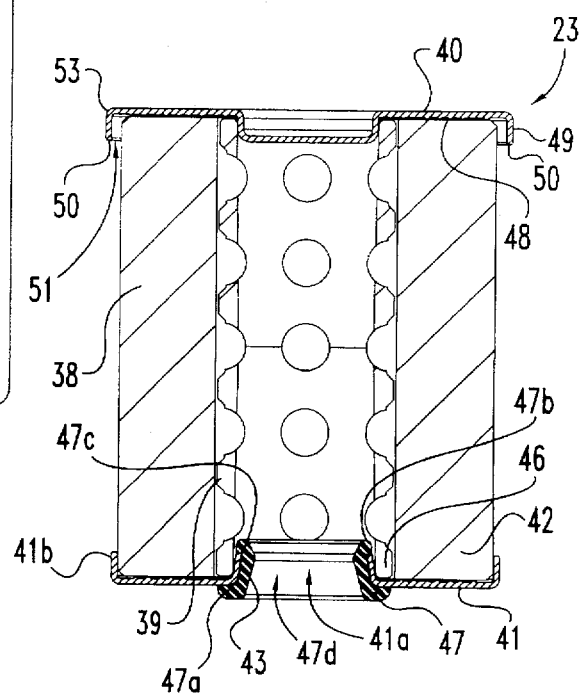
FIG. 4 is a side elevational view in full section of the FIG. 2 filter cartridge.
Figure 5:
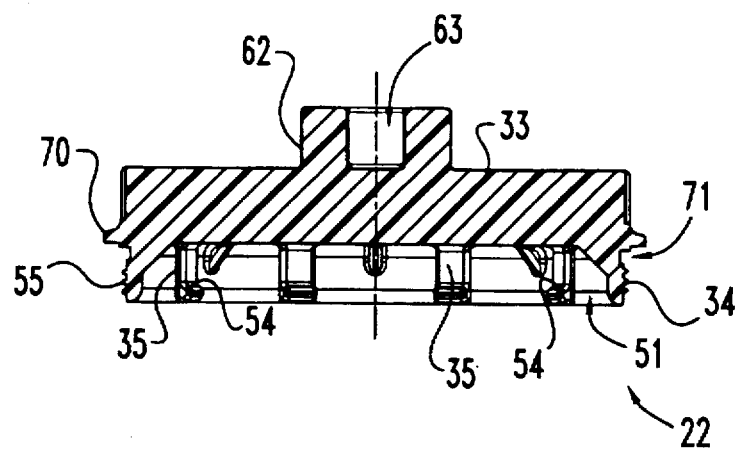
FIG. 5 is a side elevational view in full section of the lid of the FIG. 2 subassembly.
Figure 6:
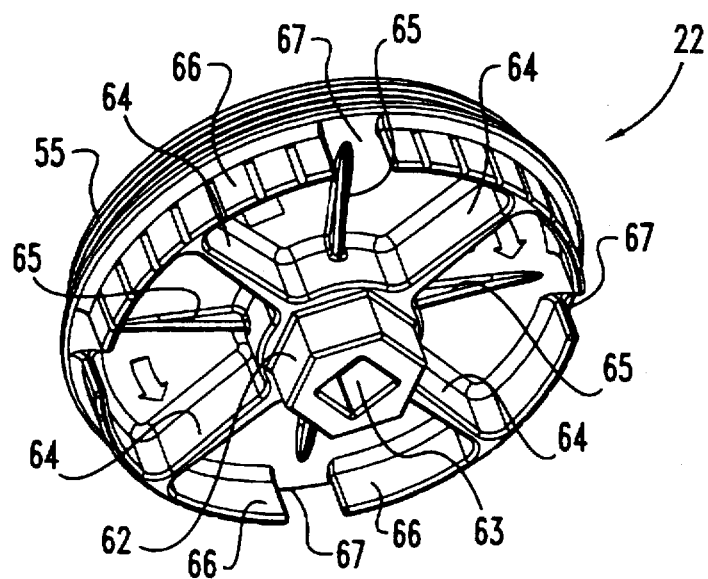
FIG. 6 is a perspective view of the top of the FIG. 5 lid.
Figure 7:
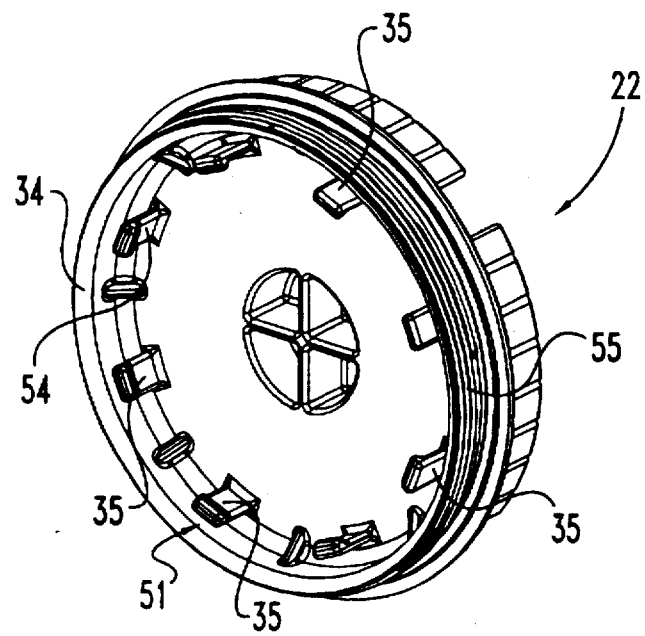
FIG. 7 is a perspective view of the bottom of the FIG. 5 lid.
Figure 8:
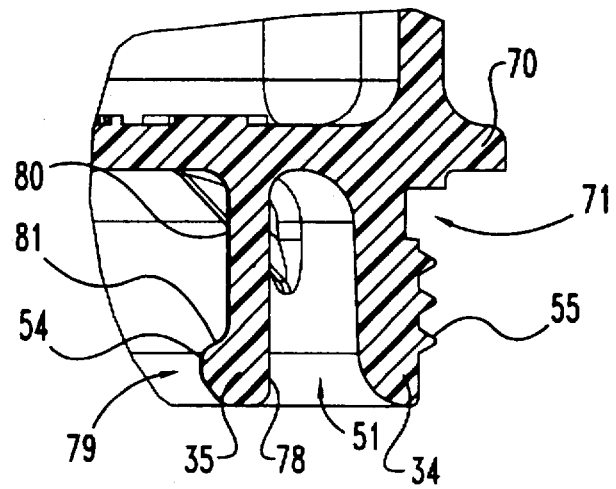
FIG. 8 is a partial, enlarged detail, side elevational view in full section of the FIG. 5 lid.

Referring now to FIGS. 3 and 4, in addition to a continued reference to FIGS. 1 and 2, endplate 41 is bonded to the lower end 42 of filter element 38. This is the end which is inserted first into the outer housing 21. Endplate 41 has an annular ring shape which defines an open center portion 41a. Inner lip 43 extends over and around the lower edge 46 of the inner liner 39. The inner lip 43 is oriented with a slight incline (inward and upward), thereby creating an inner lip shape that approximates a truncated cone. The outer wall 41b of endplate 41 is substantially cylindrical and its inner surface fits snugly against the outside diameter surface of filter element 38 adjacent lower end 42. The outer surface of wall 41b is spaced apart from the outside diameter surface of the filter element a distance which is substantially equal to the thickness of outer wall 41b.

Annular sealing gasket 47 includes a lower radial lip 47a and an upper radial lip 47b. The outside diameter size of lip 47b is a little smaller than the outside diameter of lip 47a as would be understood from the assembly of gasket 47 on endplate 41 and in particular over inner lip 43, as is illustrated. Upper radial lip 47b includes an annular undercut ledge 47c which extends over the free edge of lip 43.

The sidewall of gasket 47 defines a hollow interior 47d which is designed to compress snugly against the outside diameter surface of centerpost 24 in order to create a sealed, liquid-tight interface at that location (see FIG. 1). The lower radial lip 47a rests against the lower surface of endplate 41 and in the FIG. 1 assembly, the entire circumference of lip 47a presses against the annular upper edge 31a of stem 31 so as to create a sealed, liquid-tight interface at that location.

The inner liner 39 includes a corrugated-type shape with a series of annular ribs 39a separated by an alternating series of recessed areas 39b. The inherent stiffness of the liner provides support for the filter element and prevents its collapse. The apertures 39c provide flow paths for the fluid being filtered to exit from the filter element 38 and enter the hollow interior of the filter cartridge 23.

The other endplate 40 is bonded to end 48 of filter element 38 which end is adjacent to closing lid 22 in the FIG. 1 fluid filter assembly. While endplate 41 is close fitting onto the end of the filter element 38, endplate 40 is intentionally over-sized with an increased outside diameter so that the outer wall 49 is clearly larger than the outside diameter of the filter element 38 and accordingly is noticeably spaced apart from the outside diameter of the filter element. A comparison between endplates 40 and 41 relative to the outer, substantially cylindrical surface of the filter element 38 shows that endplate 40 has a larger outside diameter than endplate 41. As illustrated, the inside surface of outer wall 41b is in direct contact with the outside surface of the filter element 38 except for any bonding adhesive which may happen to be present. With a relatively thin wall for outer wall 41b, the outside diameter size of wall 41b is just slightly larger than the outside diameter size of the filter element. The distance of separation substantially corresponds to the wall thickness of wall 41b. In contrast the outside diameter size of outer wall 49 is noticeably larger than the outside diameter of the filter element so as to define an annular clearance space between wall 49 and the filter element. This spacing creates an outer, free edge or lip 50 over which the series of snap-over fingers 35 snap so as to assemble the closing lid 22 onto the replaceable filter cartridge 23. The annular clearance space 51 is important so as to provide a space for the fingers to extend into as the fingers wrap around lip 50. The snap-fit assembly of the fingers 35 over endplate 40 is illustrated without the outer housing in FIG. 2. FIGS. 3 and 4 illustrate the details of the replaceable filter cartridge 23.

As will be understood, the build up of the fluid filter assembly 20 begins with the fabrication of the filter element 38 and the assembly of the inner liner 39 into the hollow interior of the filter element. Thereafter, the two endplates 40 and 41 are bonded to their corresponding filter element ends by a suitable adhesive. Sealing gasket 47 may be formed onto endplate 41 before or after the attachment of endplate 41 to the filter element. The next step is to snap the closing lid 22 onto the upper endplate 40. This assembly step is achieved by concentrically aligning the two components and then simply pushing the lid 22 down onto the upper endplate 40. The fingers 35 (see FIGS. 5–8) are shaped so as to easily flex in an outward direction as the radiused corner 53 of outer wall 49 is initially contacted. Then, when the fingers 35 slide past lip 50, the fingers snap back inwardly into annular clearance space 51 such that the inwardly-extending locking lip 54 on each finger locks around and over lip 50 on the outer wall 49. With the closing lid 22 and filter cartridge 23 snapped together in this manner, this subassembly (see FIG. 2) is inserted into the outer housing and threaded into position by the engagement of the threads 55 on the outer wall 34 with the series of internal threads 30.

The seating of the filter cartridge 23 into the outer housing 21 may be accomplished in a variety of ways. As illustrated in FIG. 1, the closed end 26 of the outer housing 21 is integrally molded with a post-like stem 31 which is centered within the outer housing and axially extends away from closed end 26 into the hollow interior 57 of the outer housing. Stem 31 is internally threaded and by thread engagement receives centerpost 24. Centerpost 24 has a first portion 58 which has an outside diameter size that is slightly smaller than the outside diameter size of enlarged portion 59. The inside diameter of gasket 47 is sized so as to slide somewhat easily over first portion 58 and then create a liquid-tight fit around portion 59 and against upper end 31a. It is the somewhat larger outside diameter size of portion 58 which creates a dimensional interference with the inside diameter size of gasket 47. This causes the gasket to compress and conform in a sealed fashion around portion 59.

Referring now to FIGS. 5–8, additional details of the closing lid 22 are illustrated. The upper body portion 33 of the closing lid 22 includes a centered, hex-shaped hub 62 with a square recess 63 formed therein and a series of integral radiating ribs 64. There are a total of four ribs 64 which are equally spaced 90 degrees apart. Located between each pair of adjacent ribs 64 is smaller stiffening rib 65. There are also four stiffening ribs 65 which are equally spaced 90 degrees apart. Each rib 64 extends outwardly and is integral with a corresponding wall section 66. The four wall sections 66 are each centered relative to a corresponding rib 64 and each rib 65 is centered on a corresponding opening 67. The four openings 67 are positioned between the four wall sections 66. The square recess 63 may be used with a square socket drive to either advance the lid 22 into the outer housing 21 and/or to remove the lid from the outer housing. As another option, the outer hex shape of hub 62 may be used for advancing and/or removing the lid 22. The four ribs 64 provide a means for advancing and/or removing the lid manually.

The outer annular wall 34 is configured with a radial lip 70 and an annular O-ring channel 71. The O-ring channel 71 is positioned between threads 55 and radial lip 70 and is sized and shaped to receive O-ring 25. It is intended for the O-ring 25 to be preassembled onto lid 22 and remain with the lid. In this way, the lid can be advanced onto the outer housing and removed from the outer housing without having to be concerned with any loose parts coming off. The lid 22 is sized and shaped relative to the outer housing 21 such that the O-ring 25 is compressed to the desired degree so as to establish a liquid-tight seal as the underside of radial lip 70 abuts up against the upper, substantially flat surface 72 of outer annular wall 28.

The annular clearance space 75 between outer wall 34 and the eight fingers 35 provides a clearance region for the outward flexing movement of the fingers 35, which movement causes the snap-over fingers 35 to disengage from the replaceable filter cartridge 23. Such outward flexing occurs when the top surface of upper body portion 33 is flexed into a concave curvature which causes the bottom surface to take on a convex curvature.

Each snap-over finger 35 has a molded shape which includes an outer surface 78 which has a slight curvature in a circumferential direction and is substantially straight in the axial direction. The opposite (inner) side surface 79 of each finger 35 has an axially straight upper portion 80 which extends downwardly and terminates into locking lip 54. Each locking lip 54 has various curved and flat portions as illustrated in cross-section which are disposed between outer surface 78 and upper portion 80, as is illustrated. The inward extent of locking lip 54 creates an upper locking edge 81 for snap-over abutment onto the lip 50 of the outer wall 49 of endplate 40.

When the closing lid 22 is bent into a concave/convex curvature so as to flex the fingers 35 in an outward direction, the locking edge 81 of at least some of the fingers are able to slide off of lip 50 and this occurs with enough of the fingers 35 so as to be able to release the filter cartridge 23 for disposal. Accordingly, the user, while handling only the lid 22, can extract the dirty filter cartridge 23 and move it to a disposal container. The lid is then flexed and enough of the fingers become disengaged from the filter cartridge so allow the cartridge to fall free. Once the dirty filter cartridge has been removed, the same lid is simply pushed down onto a new, clean filter cartridge which is then able to be installed into the same outer housing.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A replaceable filter cartridge for use in a fluid filter assembly comprises:

a filter element having a substantially cylindrical outer surface and a pair of oppositely-disposed filter element ends;

a first endplate bonded to one of said pair of oppositely-disposed filter element ends, said first endplate having an outer, substantially annular wall including an exterior surface which is positioned at a first distance of separation radially beyond the outer surface of said filter element; and a second endplate bonded to the other one of said pair of oppositely-disposed filter element ends, said second endplate having an outer, substantially annular wall which is positioned at a second distance of separation radially beyond the outer surface of said filter element, wherein said second distance of separation is greater than said first distance of separation and wherein the outer, substantially annular wall of said second endplate in combination with the outer surface of said filter element define an annular clearance space therebetween, said annular wall including a substantially annular free edge.

2. The replaceable filter cartridge of claim 1 wherein the substantially annular wall of said first endplate has a wall thickness which substantially corresponds to said first distance of separation.

3. The replaceable filter cartridge of claim 2 wherein the radial width of said annular clearance space substantially corresponds to said second distance of separation.

4. The replaceable filter cartridge of claim 3 which further includes an annular sealing gasket which is assembled to said first endplate.

5. The replaceable filter cartridge of claim 1 wherein the radial width of said annular clearance space substantially corresponds to said second distance of separation.

6. The replaceable filter cartridge of claim 1 which further includes an annular sealing gasket which is assembled to said first endplate.

7. A replaceable filter cartridge for use in a fluid filter assembly comprises:

a filter element having a substantially cylindrical outer surface and a pair of oppositely-disposed filter element ends;

a first endplate assembled to one of said pair of oppositely-disposed filter element ends; and a second endplate assembly to the other one of said pair of oppositely-disposed filter element ends, said second endplate having a substantially cylindrical outer wall which is radially spaced apart from said filter element and in combination with said filter element defines a substantially annular clearance space between the outer wall of said second endplate and the filter element, said outer wall includes a substantially annular free edge.

8. A fluid filter subassembly for assembly into a fluid filter outer housing comprises:

a replaceable filter cartridge including a filter element and an endplate attached to an end of said filter element, and said endplate includes an outer wall which is radially spaced apart from said filter element and in combination with said filter element defines a clearance space between the outer wall of said endplate and the filter element; and a separable snap-on lid constructed and arranged to assemble to said outer housing, said snap-on lid including a plurality of spaced apart locking fingers which are snapped onto said endplate to create said fluid filter subassembly, said snap-on lid being separable from said replaceable filter cartridge by flexing said snap-on lid.

9. The fluid filter subassembly of claim 8 wherein each of the plurality of spaced apart fingers includes an inwardly-extending locking lip portion.

10. The fluid filter subassembly of claim 9 wherein the locking lip portions of said plurality of spaced apart fingers are positioned between said outer wall and said filter element.

11. The fluid filter subassembly of claim 10 wherein the outer surface of said filter element is substantially cylindrical, said outer wall is substantially cylindrical, and said clearance space is substantially annular.

12. A fluid filter assembly for the filtering of a fluid substance comprises:

an outer housing having a sidewall defining a hollow interior and an open end;

a replaceable filter cartridge including a filter element and an endplate attached to an end of said filter element, said endplate includes an outer wall which is radially spaced apart from said filter element and in combination with said filter element defines a clearance space between the outer wall of said endplate and the filter element; and a separable snap-on lid constructed and arranged to assemble to said outer housing, said snap-on lid including a plurality of spaced apart locking fingers which are snapped onto said endplate to create said fluid filter subassembly, said snap-on lid being separable from said replaceable filter cartridge by flexing said snap-on lid.

13. The fluid filter assembly of claim 12 wherein each of the plurality of spaced apart fingers includes an inwardly-extending locking lip portion.

14. The fluid filter assembly of claim 13 wherein the locking lip portions of said plurality of spaced apart fingers are positioned between said outer wall and said filter element.

15. The fluid filter assembly of claim 12 wherein said open end is internally threaded and said snap-on lid is externally threaded for threaded engagement into said outer housing.

16. A replaceable filter cartridge for use in a fluid filter assembly comprises:

a filter element having an outer surface and a pair of oppositely-disposed filter element ends;

a first endplate assembled to one of said pair of oppositely-disposed filter element ends; and a second endplate assembled to the other one of said pair of oppositely-disposed filter element ends, said second endplate having an outer wall which is radially spaced apart from said filter element and in combination with said filter element defines a clearance space between the outer wall of said second endplate and the filter element, said outer wall includes a substantially annular free edge.

* * * * *

UNITED STATES PATENT AND TRADEMARK OFFICE
CERTIFICATE OF CORRECTION

PATENT NO. : 5,753,117
DATED : May 19, 1998
INVENTOR(S) : Zemin Jiang

It is certified that error appears in the above-identified patent and that said Letters Patent is hereby corrected as shown below:

On the title page,
  item [56] (References Cited – U.S. Patent Documents) please add the following:

-- 5,290,445    3/1994        Buttery -- item [56] (References Cited – Foreign Patent Documents) please add the following:

-- 1,151,592    5/1969    United Kingdom
   1,162,696    8/1969    United Kingdom --

Signed and Sealed this

Second Day of February, 1999

Attest:

Attesting Officer

*Acting Commissioner of Patents and Trademarks*